(12) United States Patent                (10) Patent No.:     US 8,512,552 B1
    Rossi                                 (45) Date of Patent:     Aug. 20, 2013

(54) ABSORBENT SPILL CLEAN-UP MAT

(71) Applicant: Rossi Properties, Inc., Newport Beach, CA (US)

(72) Inventor: Thomas R. Rossi, Newport Beach, CA (US)

( * ) Notice: Subject to any disclaimer, the term of this patent is extended or adjusted under 35 U.S.C. 154(b) by 0 days.

(21) Appl. No.: 13/674,020

(22) Filed: Nov. 10, 2012

Related U.S. Application Data

(60) Provisional application No. 61/559,061, filed on Nov. 12, 2011.

(51) Int. Cl.
  *B01D 24/00* (2006.01)
  *B01D 39/04* (2006.01)

(52) U.S. Cl.
  USPC .......... 210/85; 210/242.4; 210/282; 210/322; 210/484; 210/499; 210/502.1; 210/924; 15/244.3; 428/36.4; 428/36.5; 428/156; 428/187

(58) Field of Classification Search
  USPC ............. 210/85, 242.4, 282, 484, 502.1, 924, 210/322, 499; 15/244.3, 244.4; 428/36.4, 428/36.5, 156, 187
  See application file for complete search history.

(56) References Cited

U.S. PATENT DOCUMENTS

| | | | | |
|---|---|---|---|---|
| 1,386,041 A | * | 8/1921 | Wilson | 401/201 |
| 4,031,839 A | * | 6/1977 | Pedone | 114/382 |
| 4,059,528 A | * | 11/1977 | Grosshandler | 210/282 |
| 4,111,813 A | * | 9/1978 | Preus | 210/282 |
| 4,366,067 A | * | 12/1982 | Golding et al. | 210/671 |
| 4,497,712 A | * | 2/1985 | Cowling | 210/691 |
| 4,813,944 A | | 3/1989 | Haney | |
| 4,838,947 A | * | 6/1989 | Levy et al. | 134/7 |
| 4,840,734 A | * | 6/1989 | Johnson | 210/660 |
| 5,066,527 A | | 11/1991 | Newell | |
| 5,252,374 A | | 10/1993 | Larsonniur | |
| 5,391,415 A | * | 2/1995 | Bair | 428/74 |
| 5,434,339 A | | 7/1995 | La Motte | |
| 5,518,797 A | * | 5/1996 | Holland | 428/132 |
| 5,706,535 A | | 1/1998 | Takashima | |
| 5,834,385 A | | 11/1998 | Blaney | |
| 5,985,442 A | | 11/1999 | Nagaya | |
| 6,974,617 B2 | | 12/2005 | Kingery | |
| 2010/0047501 A1 | * | 2/2010 | Bober | 428/43 |

* cited by examiner

*Primary Examiner* — Matthew O Savage
(74) *Attorney, Agent, or Firm* — QuickPatents; Kevin Prince

(57) ABSTRACT

A mat for cleaning a liquid spill on a surface has a flexible, liquid-permeable outer shell having a top side, a bottom side, and a peripheral edge. The top and bottom sides are mutually fastened at a fastening area so that an interior space is segregated into a plurality of compartments, each compartment retaining an absorbent material therein. The absorbent material is preferably a powdered polyurethane foam material. In one embodiment, the absorbent material within each compartment is contained within a rectangular substantially flat inner section having a top surface, a bottom surface and a peripheral edge, such that the mat is foldable between such inner sections but not easily folded across each inner section.

20 Claims, 4 Drawing Sheets

ABSORBENT SPILL CLEAN-UP MAT

CROSS-REFERENCE TO RELATED APPLICATIONS

This application claims the benefit of U.S. Provisional Patent Application 61/559,061, filed on Nov. 11, 2011, and incorporated herein by reference.

STATEMENT REGARDING FEDERALLY SPONSORED RESEARCH AND DEVELOPMENT

Not applicable.

FIELD OF THE INVENTION

This invention relates to cleaning of spills, and more particularly to a spill-absorbing mat.

DISCUSSION OF RELATED ART

While lose absorbent powders are well known for absorbing hydrocarbon contaminants in the environment, such as hydrocarbons like oil in a lake or pond, for example, use of such free powders has its own environmental drawbacks. Such free powder, when blown by the wind, becomes difficult or impossible to collect. Several prior art devices aim to contain such absorbent powders within a liquid-permeable tube. However, hydrocarbons typically do not penetrate into the center of such tubes because they are absorbed at the perimeter, which then becomes saturated and blocks the hydrocarbons from absorbing further towards the center of such tubes.

Accordingly, a mat or other flat configuration would be desirable for containing such absorbent powders. Further, there is a need for such a product that would be less bulky and inefficient to transport. Moreover, such a needed product would be readily re-usable once pressed under sufficient pressure to remove the hydrocarbons therefrom. The present invention accomplishes these objectives.

SUMMARY OF THE INVENTION

The present device is a mat for cleaning a liquid spill on a surface, such as a hydrocarbon spill on a water surface including a tank, pond, reservoir, lake, river, ocean, or the like. Alternately, the spill may be of a water-based liquid on a hard surface, such as cement, streets, floors, tables, sidewalks or the like.

The mat includes a flexible, liquid-permeable outer shell having a top side, a bottom side, and a peripheral edge. The top side and bottom side define an interior space therebetween. The top and bottom sides are mutually fastened at a fastening area so that the interior space is segregated into a plurality of compartments, each compartment retaining an absorbent material therein. Preferably the outer shell includes at least one connection point, such as at a grommet or the like, proximate the peripheral edge thereof.

Such an outer shell may be made from a flexible hydrophilic woven or paper material for applications allowing for the absorption of water into the outer shell, such as when a water-based spill has occurred on a hard surface. Alternately, the outer shell may be made from a hydrophobic mesh or woven material for applications not suitable for the absorption of water into the outer shell, such as when the mat must be able to float on a contaminated water surface, for example.

The absorbent material is preferably a powdered polyurethane foam material. Such an absorbent material may include weighted elements for causing the mat to at least partially submerge under a water surface.

In one embodiment, the absorbent material within each compartment is contained within a rectangular substantially flat inner section having a top surface, a bottom surface and a peripheral edge. Such an inner section may be made from a flexible hydrophilic woven or paper material for applications allowing for the absorption of water into the inner section, such as when a water-based spill has occurred on a hard surface. Alternately, the inner section may be made from a hydrophobic mesh or woven material for applications not suitable for the absorption of water into the inner section, such as when the mat must be able to float on a contaminated water surface, for example.

Such an inner section may further include a non-flexible, rigid or semi-rigid elongated stiffener therewithin, such that a mat having several of the inner sections may fold between such inner sections, but may not easily fold across the inner sections. In one embodiment, such stiffeners in a mat having multiple inner sections are traversely scored with a score line, preferably mutually aligned such that the inner sections may be folded in one direction between each inner section and traversely at each mutually aligned score line.

The present invention is a mat that includes a polyurethane powder for absorbing and/or adsorbing fluid spills, particularly hydrocarbon spills. The present device is less bulky than the tubes of the prior art, and as such can be transported more efficiently. Moreover, the present invention is readily re-usable once pressed under sufficient pressure to remove the hydrocarbons therefrom. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. The word "absorb" and its derivatives for the purposes of this disclosure may also refer to "adsorb."

Figure 1:
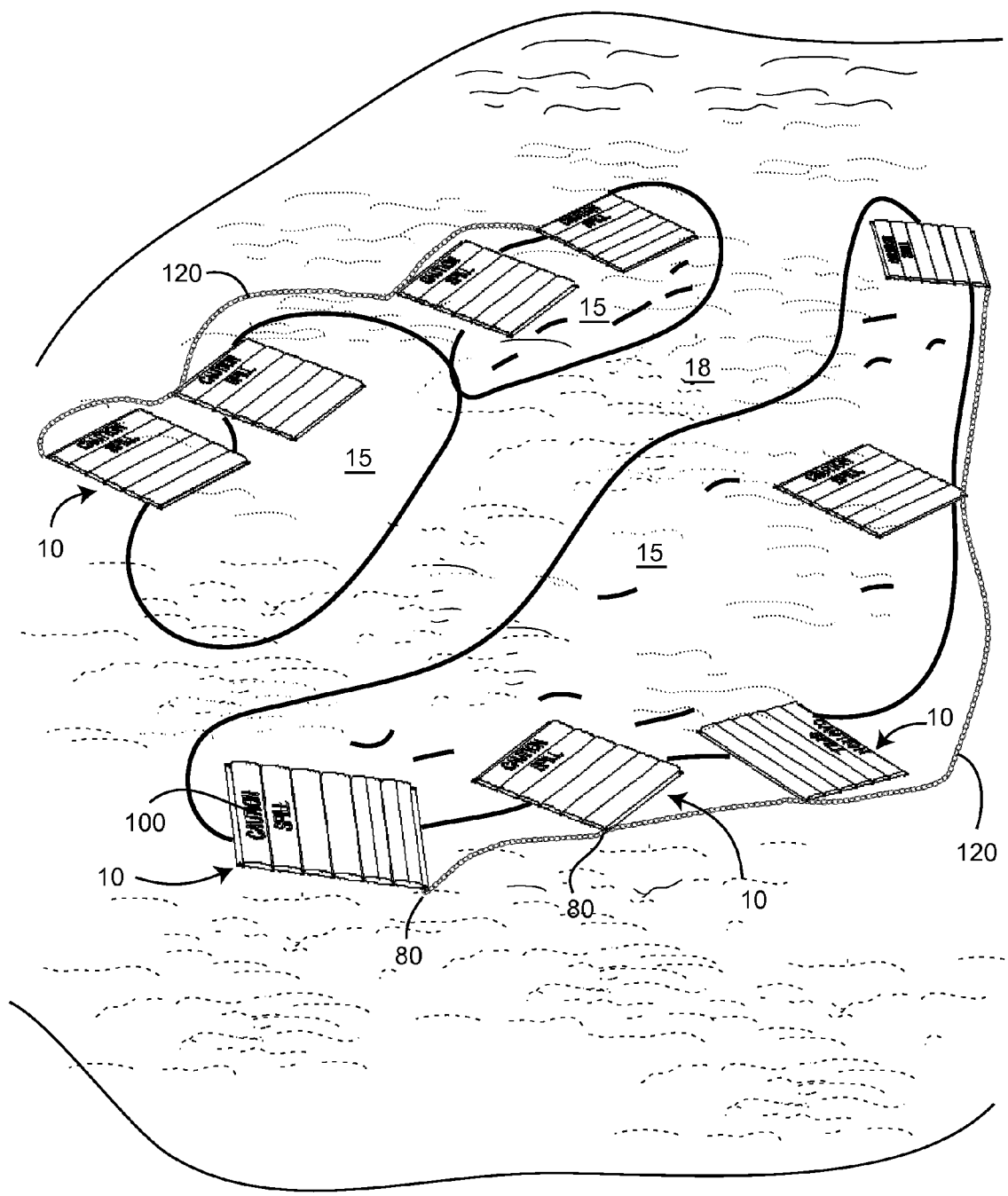
FIG. 1 is a perspective view of the invention, illustrated with mats of the invention in use on a body of water with a buoyant chemical spill.
Figure 2:
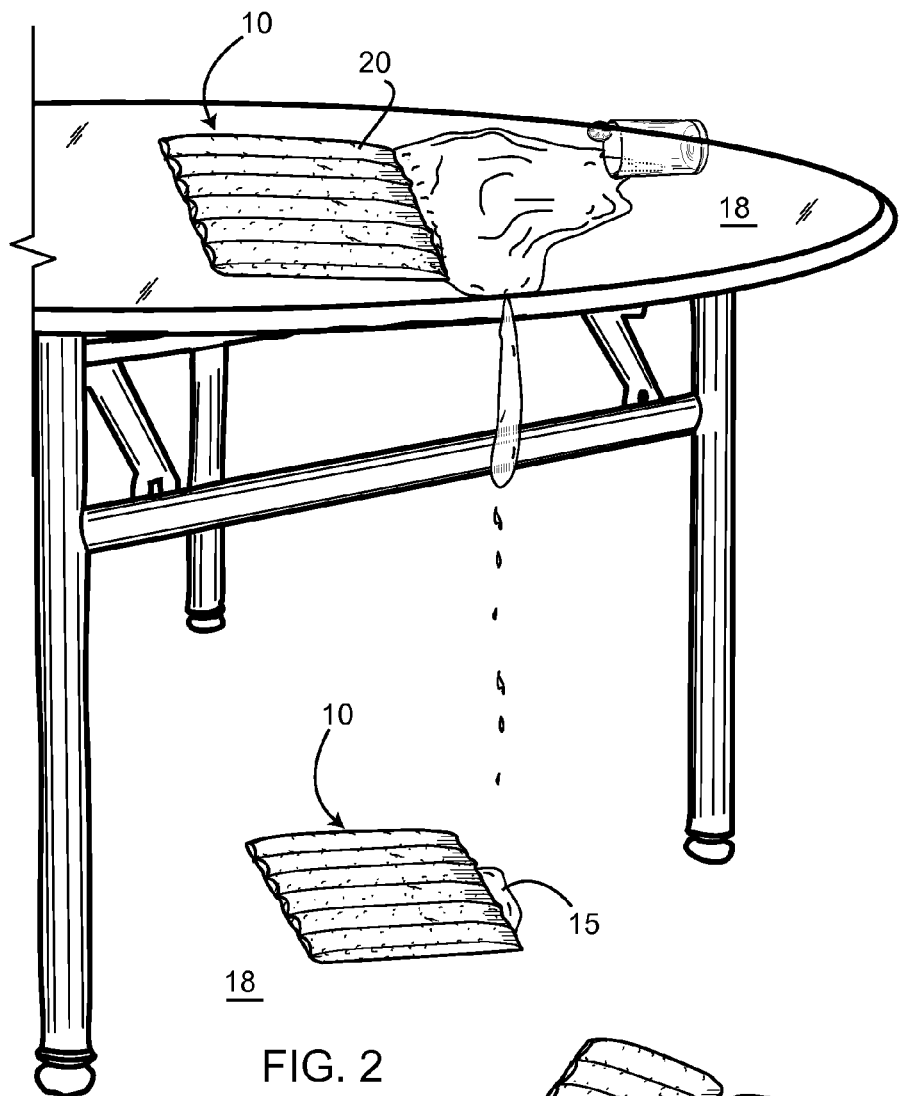
FIG. 2 is a perspective view of the invention, illustrated in use on a solid surface with a liquid spill.
Figure 3:
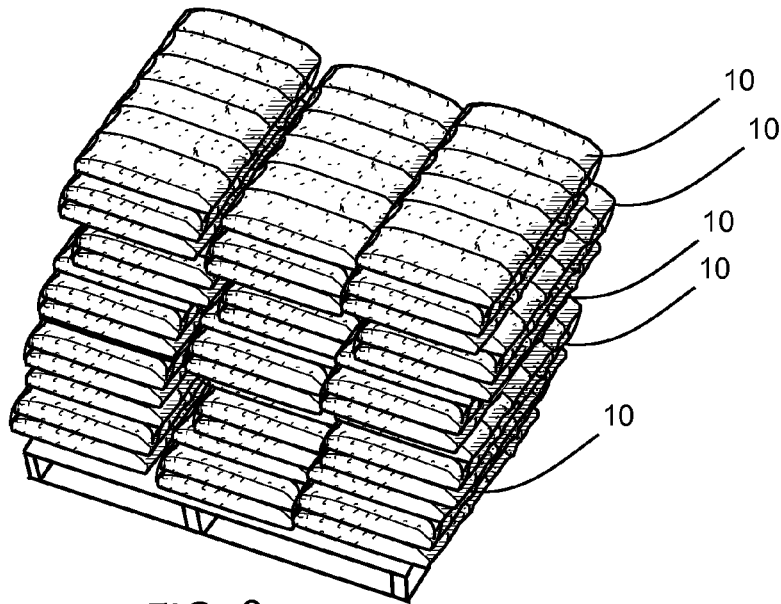
FIG. 3 is a stack of the mats in a folded configuration for transport.

FIGS. 1 and 2 show a mat 10 for cleaning a liquid spill 15 on a surface 18, such as a hydrocarbon spill 15 on a water surface 18, such as a tank, pond, reservoir, lake, river, ocean, or the like. Alternately, the spill 15 may be of a water-based liquid on a hard surface 18, such as cement, streets, floors, tables, sidewalks or the like.

The mat 10 includes a flexible, liquid-permeable outer shell 20 having a top side 28, a bottom side 22, and a peripheral edge 25. The top side 28 and bottom side 22 define an interior space 30 therebetween. The top and bottom sides 28,22 are mutually fastened at a fastening area 40 so that the interior space 30 is segregated into a plurality of compartments 50, each compartment 50 retaining an absorbent material 60 therein. The outer shell 20 has a generally flat configuration, and is preferably a single sheet 21 of flexible, liquid-permeable material folded over itself and fastened at the edges thereof, such as with heat fusion, adhesive, sewing, or other suitable fastening means. Preferably the outer shell 20 includes at least one connection point 80, such as a grommet 110 or the like, proximate the peripheral edge 25 thereof. As such, a plurality of the mats 10 may be tied together with a zip-tie 120, or similar fastener, to create a row of such mats tied together and less likely to individually blow away in the wind, such as can be important in outdoor applications.

Such an outer shell 20 may be made from a flexible hydrophilic woven or paper material for applications allowing for the absorption of water into the outer shell 20, such as when a water-based spill has occurred on a hard surface 18. Alternately, the outer shell 20 may be made from a hydrophobic mesh or woven material for applications not suitable for the absorption of water into the outer shell 20, such as when the mat 10 must be able to float on a contaminated water surface 18, for example.

The absorbent material 60 is preferably a powdered polyurethane foam material, preferably pulverized into particle sizes of between 100 and 500 microns. Such an absorbent material 60 may included weighted elements for causing the mat 10 to at least partially submerge under a water surface 18.

In another embodiment, the absorbent material 60 is a granulated polyurethane foam material formed into particle sizes of between 0.05-0.50 inches in diameter. In such an embodiment, the outer shell 20 may be made from a mesh such as conventional nylon window screen material. As such, petrochemical-laden water may readily flow through such an embodiment while being cleaned. Preferably a plurality of such mats 10 may be stacked (not shown) in a tube or the like so that contaminated water passes through the stack of such mats 10 for effective cleaning of the water.

In another embodiment, the outer shell 20 takes the form of an elongated tube of a mesh material filled with the granulated polyurethane foam material formed into particle sizes of between 0.05-0.50 inches in diameter. Such an embodiment is useful for placement in front of a street storm drain (not shown), for example, where petrochemical-laden water run-off from the street is first cleaned through the mat 10 before entering the storm drain.

In one embodiment the compartments 50 are formed by fastening the top and bottom sides 28,22 along generally parallel lines 41 to form generally parallel compartments 51 open at an open edge 26 of the outer shell 20. In one embodiment, a caution indicia 100 is printed on the top side 28 of the outer shell to warn passersby of a potentially dangerous spill condition while the mat 10 absorbs the spill.

Figure 4:
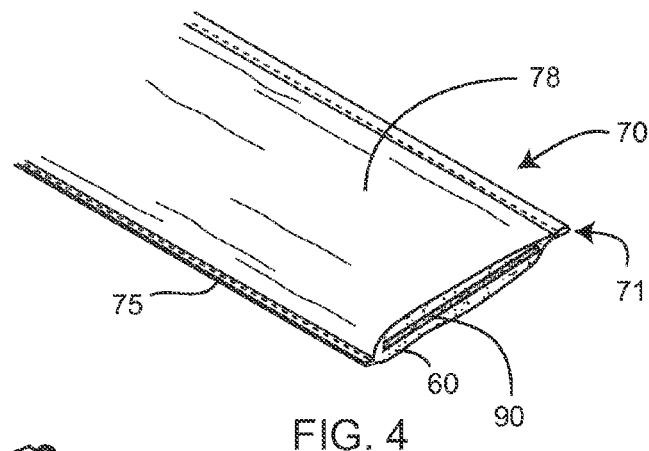
FIG. 4 is a partial perspective view of an inner section of the invention, illustrated with an open end.
Figure 5:
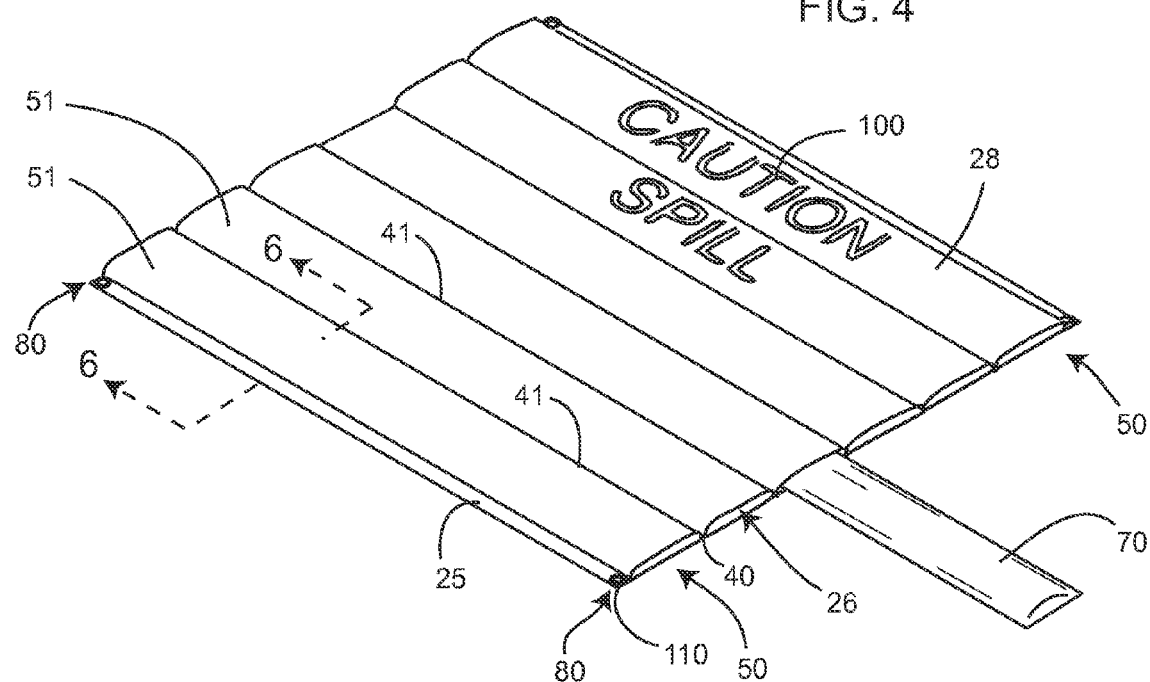
FIG. 5 is a partially exploded perspective view of the invention.
Figure 6:
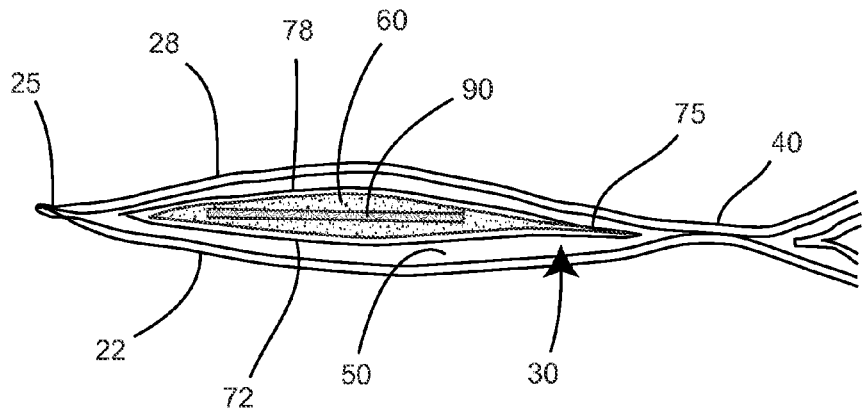
FIG. 6 is a cross-sectional view of the invention, taken generally along lines 6-6 of FIG. 5.

In one preferred embodiment, the absorbent material 60 within each compartment 50 is contained within a rectangular substantially flat inner section 70 having a top surface 78, a bottom surface 72 and a peripheral edge 75 (FIGS. 4, 5 and 6). The top surface 78 and bottom surface 72 of each inner section 70 is preferably a single sheet 71 of flexible, liquid-permeable material folded over itself and fastened at the edges thereof, such as with heat fusion, adhesive, sewing, or other suitable fastening means.

Such an inner section 70 may be made from a flexible hydrophilic woven or paper material for applications allowing for the absorption of water into the inner section 70, such as when a water-based spill has occurred on a hard surface 18. Alternately, the inner section 70 may be made from a hydrophobic mesh or woven material for applications not suitable for the absorption of water into the inner section 70, such as when the mat 10 must be able to float on a contaminated water surface 18, for example.

Such an inner section 70 may further include a non-flexible, rigid or semi-rigid elongated stiffener 90 (FIGS. 4 and 6) therewithin, such that a mat 10 having several of the inner sections 70 may fold between such inner sections 70, but may not easily fold across the inner sections 70. In one embodiment, such stiffeners 90 in a mat 10 having multiple inner sections 70 are traversely scored with a score line 95, preferably mutually aligned such that the inner sections 70 may be folded in one direction between each inner section 70 and traversely at each mutually aligned score line 95. Such a stiffener 90 also helps to keep the absorbent material 60 spread out within the inner section 70, inhibiting same from bunching-up, thereby increasing the available surface area of the absorbent material 60 that is exposed to the liquid 15.

In one embodiment, each mat 10 includes six of the inner sections 70, and each inner section 70 is between 36 and 40 inches in length. In such an embodiment, the mat is preferably between 28 and 32 inches in width, with each inner section 70 being between 4.5 and 5.5 inches wide and rectangular in plan view. As such, each mat 10 may be folded once between the third and fourth inner section, with three such folded mats 10 laid adjacently together, to form roughly a 45 inch by 38 inch area suitable for placing onto a conventional shipping pallet. Another such layer of three mats 10 may be then set onto the first layer, albeit rotated 90 degrees, and so on to efficiently fill a shipping pallet with a plurality of the mats 10.

Figure 7:
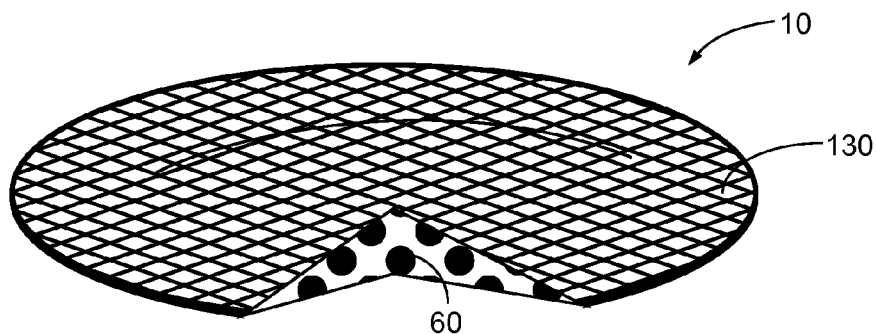
FIG. 7 is a perspective view of one embodiment of the invention, partially cut-away to reveal a granulated absorbent material contained inside a mesh web.
Figure 8:
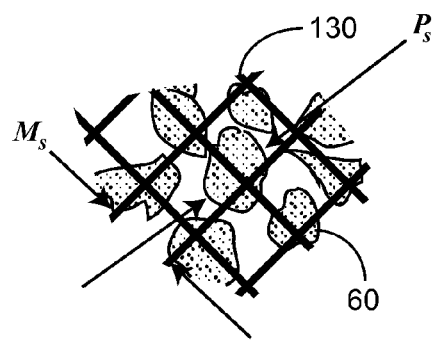
FIG. 8 is an enlarged, partial top plan view of the embodiment of FIG. 7.
Figure 9:
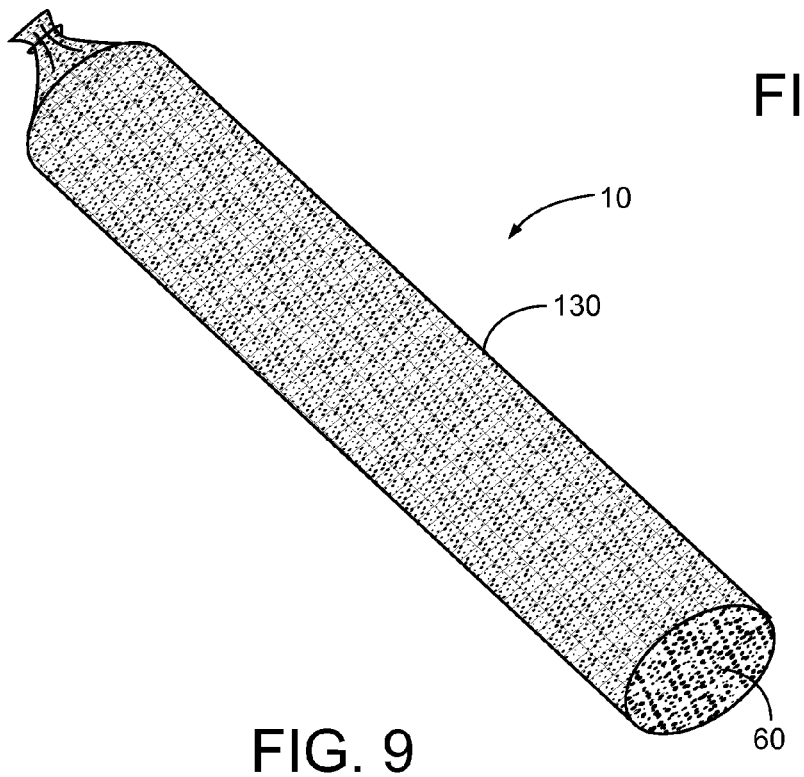
FIG. 9 is an alternate embodiment, partially cut-away, of the mesh outer shell and granulated absorbent material.

In one embodiment of the invention, the outer shell 20 comprising a mesh material 130 (FIGS. 7 and 8) having a maximum aperture size $M_s$, the interior space retaining the absorbent material 60 therein is granulated instead of pulverized, having a particle size $P_s$ of greater than the aperture size $M_s$. For example, in one embodiment, $M_s$=0.5 inches and $P_s$=0.55 inches. Alternately, $M_s$=0.1 inches and $P_s$=0.15 inches. Such a mesh material 130 may be a nylon screen material, metal screen material, plastic screen material, or the like. As such, the mat 10 may be placed in contact with the liquid 15 such that the liquid 15 permeates the outer shell and the contaminates are at least partially absorbed by the absorbent material 60. In one such embodiment, the outer shell 20 is disk-shaped (FIG. 7), whereby the liquid 15 may be compelled through a stack (not shown) of such mats 10 for cleaning of the contaminates from the liquid 15. In another such embodiment, the outer shell 10 is cigar-shaped (FIG. 9) and relatively circular in cross-section. Particle sizes $P_s$ of greater than 0.05 inches allows for the liquid 15, such as water, to more freely flow through the mat 10, such as is useful for cleaning petrochemical-laden runoff water 15 entering a storm drain (not shown), for example.

While a particular form of the invention has been illustrated and described, it will be apparent that various modifications can be made without departing from the spirit and scope of the invention. For example, while the mats 10 are illustrated in the figures as being generally rectangular in plan view, the mats 10 could also be made in any other suitable shape in plan view, such as triangular, circular, square, hexagonal, or the like. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A mat for cleaning a liquid spill on a surface, comprising: a flexible, liquid-permeable outer shell having a top side, a bottom side, and a peripheral edge, top side and bottom side defining an interior space therebetween, the top and bottom sides mutually fastened at fastening areas so that the interior space is segregated into a plurality of compartments, a plurality of inner sections each formed of a flexible liquid permeable material, wherein each said compartment contains only one of said inner sections, and wherein each inner section retains an absorbent material therein, the outer shell having a generally flat configuration;

whereby the mat may be placed upon the spill such that the liquid permeates the outer shell and is absorbed by the absorbent material.

2. The mat of claim 1 wherein the top and bottom sides of the outer shell is a single sheet of flexible, liquid-permeable material folded over itself and fastened at the edges thereof.

3. The mat of claim 1 wherein the compartments are formed by fastening the top and bottom sides along generally parallel lines to form generally parallel compartments open at an open edge of the outer shell.

4. The mat of claim 1 wherein each of said inner sections is formed as a rectangular substantially flat inner section having a top surface, a bottom surface and a peripheral edge.

5. The mat of claim 4 wherein the top surface and bottom surface of each inner section is a single sheet of flexible, liquid-permeable material folded over itself and fastened at the edges thereof.

6. The mat of claim 4 wherein each inner section is made from a flexible hydrophilic woven material.

7. The mat of claim 4 wherein each inner section is made from a flexible hydrophilic sheet material.

8. The mat of claim 4 wherein each inner section is made from a flexible hydrophobic mesh material.

9. The mat of claim 4 wherein each inner section further includes a non-flexible elongated stiffener retained therein.

10. The mat of claim 9 wherein each elongated stiffener is transversely scored, whereby the mat may be folded along the scores of each elongated stiffener when commonly aligned.

11. The mat of claim 4 wherein the plurality of inner sections is exactly six, and wherein the mat and each inner section is between 36 and 40 inches in length, and wherein the mat is between 28 and 32 inches in width, and wherein each inner section is between 4.5 and 5.5 inches wide and rectangular in plan view.

12. The mat of claim 1 wherein the outer shell includes at least one connection point proximate an peripheral edge thereof.

13. The mat of claim 12 wherein the at least one connection point is a grommet traversing the outer shell, whereby a plurality of the mats may be mutually tied together thereby.

14. The mat of claim 1 wherein the outer shell is made from a flexible hydrophilic woven material.

15. The mat of claim 1 wherein the outer shell is made from a flexible hydrophilic sheet material.

16. The mat of claim 1 wherein the outer shell is made from a flexible hydrophobic mesh material.

17. The mat of claim 1 wherein each compartment further includes a non-flexible elongated stiffener retained therein.

18. The mat of claim 17 wherein each elongated stiffener is transversely scored, whereby the mat may be folded along the scores of each elongated stiffener when commonly aligned.

19. The mat of claim 1 wherein the absorbent material includes a powdered polyurethane foam material.

20. The mat of claim 1 wherein a caution indicia is printed on a top surface of the outer shell.

\* \* \* \* \*